United States Patent [19]

Tanaka et al.

[11] Patent Number: 4,758,923
[45] Date of Patent: Jul. 19, 1988

[54] OPERATING PANELS OF INJECTION MOLDING MACHINES

[75] Inventors: Hideo Tanaka; Kiyoshi Sasaki, both of Numazu, Japan

[73] Assignee: Toshiba Kikai Kabushiki Kaisha, Tokyo, Japan

[21] Appl. No.: 81,998

[22] Filed: Aug. 5, 1987

[30] Foreign Application Priority Data

Aug. 7, 1986 [JP] Japan .......................... 61-121494[U]

[51] Int. Cl.⁴ .............................................. H02B 1/10
[52] U.S. Cl. .................................... 361/346; 361/359; 361/391
[58] Field of Search ............... 361/331, 332, 340, 346, 361/344, 358, 359, 391

[56] References Cited

U.S. PATENT DOCUMENTS 3,340,441  9/1967  Probert ............................... 361/344
4,667,271  5/1987  Wilson ............................... 361/391

Primary Examiner—A. D. Pellinen
Assistant Examiner—Gregory D. Thompson
Attorney, Agent, or Firm—Koda and Androlia

[57] ABSTRACT

A control panel of an injection molding machine is normally housed in a recess of the base of the machine. To operate operating buttons and to set operating data, the operating panel is swung to a horizontal position by a handle. The operating panel is supported by a gas filled damper connected between the bottom of the panel and the base.

3 Claims, 2 Drawing Sheets

OPERATING PANELS OF INJECTION MOLDING MACHINES

BACKGROUND OF THE INVENTION

This invention relates to an injection molding machine, and more particularly an operating panel thereof.

As shown in FIGS. 3 and 4, the prior art operating panel 11 of an injection molding machine 10 is contained in the base 12 of the machine without considering the convenience of the operator.

More particularly, the operating panel is located close to a floor FL, so that the operator must stoop down to operate various buttons or set operating data.

SUMMARY OF THE INVENTION

It is an object of this invention to provide an injection molding machine provided with an improved operating panel capable of drawing out from a recess of the base to a position at which the operator can manipulate the operating panel in an easy posture.

According to this invention there is provided an operating panel of an injection molding machine mounted on a base having a recess on one side thereof. A hinge attached to the base and a surface of the panel pivotally supports the panel in the recess. The panel is moved in an out of the recess to an operating position by a handle attached to the panel. A gas damper including a cylinder and piston is pivotally connected to the back of the panel and a surface of the base to act as a buffer when the panel is moved from the operating position back into the recess.

DESCRIPTION OF THE PREFERRED EMBODIMENT

Figure 1:
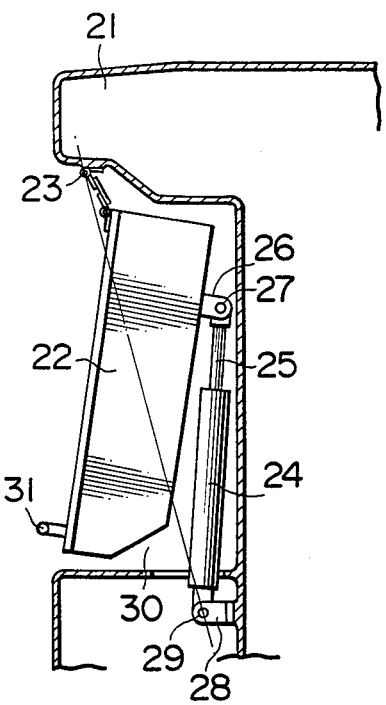
FIG. 1 is a view of an operating panel according to this invention housed in a recess of the base of the injection molding machine.

A preferred embodiment of the operating panel of this invention will now be described with reference to FIGS. 1 and 2. The operating panel 22 is pivotally supported by base 21 of the injection molding machine by a hinge 23. A gas damper 24 in the form of a piston-cylinder assembly is provided for normally urging the piston rod 25 by the pressure of gas sealed in the cylinder. The outer end of the piston rod of the gas damper 24 is pivotally connected to the rear side of the operating panel 22 through a supporting piece 26 and a pin 27. The opposite end of the cylinder of damper 24 is pivotally connected through a pin 29 to a projection 28 secured to the base 21. Normally, the operating panel 22 is contained in a recess 30 formed in one side surface of the bed 21.

Figure 2:
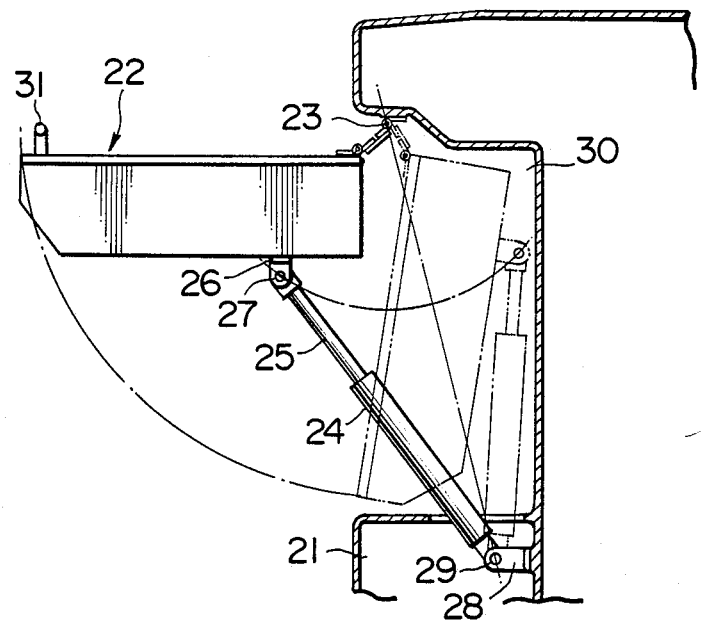
FIG. 2 is a view of the operating panel in a pulled out state.
Figure 4:
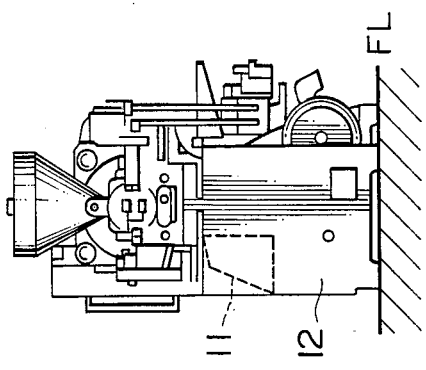
FIG. 4 is an end view of the machine shown in FIG. 3.
Figure 3:
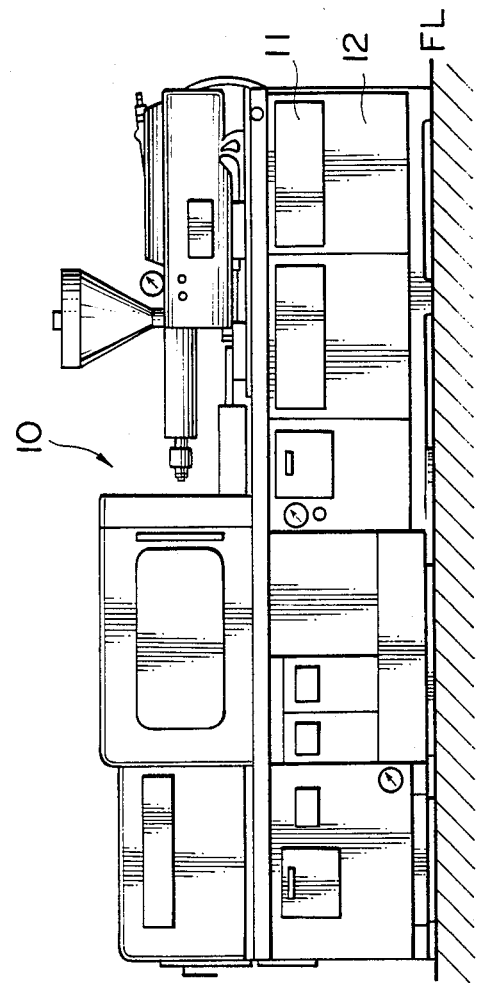
FIG. 3 is a side view of a prior art injection molding machine.

When it is desired to swing the operating panel 22 from the retracted position shown in FIG. 1 to the operating position shown in FIG. 2, in which it is easy to operate keys or buttons on the operating panel or to set various operating data, the operator grasps a handle 31 at the front end of the panel for swinging outwardly the same. As the operating panel is returned to the position shown in FIG. 1, the gas contained in the cylinder is compressed thus providing a buffer action.

As above described with the operating panel described above, the operating panel can readily be swung between the operating position and the retracted position so that the operator can readily operate the operating panel. Moreover, when the operating panel is swung back into the recess it does not interfere with the movement of the operator.

What is claimed is:

1. An operating panel of an injection molding machine mounted on a base having a recess on one side thereof, comprising:

means on said base and a front surface of said operating panel for pivotally supporting said operating panel to be swingable into and out of said recess;

handle means provided for said operating panel for pulling out said operating panel from said recess to an operating position;

a gas damper including a cylinder and a piston rod;

means for pivotally connecting said piston rod to a rear surface of said operating panel; and means for pivotally connecting one end of said cylinder to said base.

2. The operating panel according to claim 1 wherein an upper surface of said operating pannel is substantially horizontal when said operating panel is pulled out to said operating position.

3. The operating panel according to claim 1 wherein gas is contained in said cylinder between said piston rod and said one end of said cylinder so as to provide a cushion effect when said operating panel is swung back into said recess.

* * * * *